United States Patent
Jacobs et al.

(10) Patent No.: US 12,093,918 B2
(45) Date of Patent: Sep. 17, 2024

(54) SYSTEMS AND METHODS FOR SECURE AUTHENTICATION OF ONLINE TRANSACTIONS USING TOKENS

(71) Applicant: CAPITAL ONE SERVICES, LLC, McLean, VA (US)

(72) Inventors: Drew Jacobs, Arlington, VA (US); Daniel Beck, Arlington, VA (US); Hannes Jouhikainen, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 654 days.

(21) Appl. No.: 17/228,639

(22) Filed: Apr. 12, 2021

(65) Prior Publication Data

US 2021/0304184 A1 Sep. 30, 2021

Related U.S. Application Data

(63) Continuation of application No. 15/143,022, filed on Apr. 29, 2016, now abandoned.

(60) Provisional application No. 62/156,057, filed on May 1, 2015.

(51) Int. Cl.
G06Q 20/32 (2012.01)
G06Q 20/36 (2012.01)
G06Q 20/38 (2012.01)

(52) U.S. Cl.
CPC ....... *G06Q 20/3224* (2013.01); *G06Q 20/367* (2013.01); *G06Q 20/385* (2013.01)

(58) Field of Classification Search
CPC .................... G06Q 20/00–425; H04L 9/00–50
See application file for complete search history.

(56) References Cited

U.S. PATENT DOCUMENTS

| | | | |
|---|---|---|---|
| 7,376,583 B1 | 5/2008 | Rolf | |
| 8,914,302 B2 * | 12/2014 | Rose | ...................... G06Q 20/40 705/16 |
| 2007/0299778 A1 | 12/2007 | Haveson et al. | |
| 2009/0187492 A1 * | 7/2009 | Hammad | ............. G06Q 40/128 705/26.1 |
| 2011/0165862 A1 | 7/2011 | Yu et al. | |
| 2012/0330843 A1 | 12/2012 | Von Mueller et al. | |

(Continued)

*Primary Examiner* — Ari Shahabi
(74) *Attorney, Agent, or Firm* — Foley & Lardner LLP

(57) ABSTRACT

Methods and systems are provided for secure payment using tokens. Consistent with disclosed embodiments, a token may be used to authenticate a transaction. The token may include token information configured to replace at least a portion of static information required to authenticate a transaction. A financial services system may provide the token to a digital wallet. The digital wallet may communicate the token to a payment application. A user-associated device may implement the digital wallet and a payment device may implement the payment application. The payment application may provide the token information to a merchant system. The merchant system may provide the token information to the financial services system. The financial services system may authenticate the transaction using the token information received from the merchant system. The disclosed methods may further include determining the proximity of the user-associated device and the payment device to authenticate the request for secure payment.

22 Claims, 9 Drawing Sheets

(56) References Cited

U.S. PATENT DOCUMENTS

| | | |
|---|---|---|
| 2013/0054336 A1 | 2/2013 | Graylin |
| 2013/0232075 A1* | 9/2013 | Monaghan ............. G06Q 20/40 |
| | | 705/44 |
| 2013/0282588 A1 | 10/2013 | Hruska |
| 2014/0089113 A1 | 3/2014 | Desai et al. |
| 2014/0279113 A1* | 9/2014 | Balasubramanian ....................... |
| | | G06Q 20/3224 |
| | | 705/21 |
| 2015/0302404 A1 | 10/2015 | Ruffer et al. |
| 2016/0034891 A1 | 2/2016 | Carpenter et al. |
| 2016/0210626 A1 | 7/2016 | Ortiz et al. |
| 2016/0283936 A1 | 9/2016 | Daniel et al. |

\* cited by examiner

SYSTEMS AND METHODS FOR SECURE AUTHENTICATION OF ONLINE TRANSACTIONS USING TOKENS

PRIORITY

This application is a continuation of U.S. application Ser. No. 15/143,022, filed Apr. 29, 2016, which claims priority to U.S. Provisional Application No. 62/156,057 filed May 1, 2015. Each of the above-referenced applications is hereby incorporated by reference in its entirety.

BACKGROUND

Authenticating online transactions using static information, such as account number and security code, exposes users to significant security vulnerabilities. Such static information may be used for many different transactions, may be difficult or complicated to change quickly, and is generally sufficient to authorize or authenticate transactions. This results in the information being easily compromised through fraud or a security breach. Such a breach may be hard to remedy and may leave a user significantly vulnerable. Additional static information unlikely to create security vulnerabilities for a user, such as a shipping address, can be tedious to provide, and users may thus avoid or abandon transactions requiring entry of such information.

Methods and systems are therefore needed for secure authentication of transactions, and for reducing the burden of entering static information describing the transaction. The disclosed embodiments address these and other problems by pre-authenticating the user with a first application. A second application seeking to authenticate an online transaction may rely on the first application for a token configured to replace static information required for authentication. The token may include information describing the transaction, reducing the burden of entering such information. The disclosed embodiments therefore improve, among other things, the user experience by reducing the number of user steps required to originate an online transaction, while also providing an additional layer of security when authenticating online transactions.

SUMMARY

The disclosed embodiments may include, for example, methods and systems for secure payment using tokens. Payment security may be achieved by replacing at least a portion of the static information used to authenticate a payment request with token information. The token information may be included in a token generated by the financial services system responsible for authenticating the transaction. The financial services system may provide the token to a digital wallet that communicates the token to a payment application. The payment application may provide the token information to a merchant system. The merchant system may return the token information to the financial services system. Because the financial services system generated the original token provided to the digital wallet, the financial services system can authenticate the transaction using the token information received from the merchant system. In some aspects, the merchant system may not store, communicate, or receive the replaced portion of static information. The digital wallet may be used to authenticate the user, and the proximity between the digital wallet and the payment application may be used to authenticate the payment application. The token information may be provided to the merchant system indirectly, by auto-filling payment forms. Thus secure payment using tokens may increase the security and convenience of online transactions for users.

The disclosed embodiments may include, for example, a method using a digital wallet for authenticating electronic financial transactions with tokens. The digital wallet may receive a request for secure payment using a financial services account from a payment application. The digital wallet may communicate the request for secure payment to a financial services system associated with the financial services account. The digital wallet may receive a single-use token generated by the financial services system from the financial services system. The single-use token may be generated in response to the request for secure payment. The single-use token may correspond to the request for secure payment. The single-use token may comprise token information configured to replace at least a portion of static information identifying the financial services account. The digital wallet may communicate the single-use token to the payment application to effectuate secure payment.

Further disclosed embodiments may include, as an additional example, a method using a payment application for authenticating electronic financial transactions with tokens. The payment application may receive a request for secure payment using a financial services account. The payment application may communicate the request for secure payment to a digital wallet. The payment application may receive a single use token from the digital wallet. The single-use token may be generated by a financial services system associated with the financial services account in response to the request for secure payment. The single-use token may correspond to the request for secure payment. The single-use token may be configured to replace at least a portion of static information identifying the financial services account. The payment application may provide the token information by to a merchant system to effectuate secure payment using the financial services account. The token information may replace at least a portion of the static information identifying the financial services account.

Additional exemplary disclosed embodiments may include a method using a merchant system for authenticating electronic financial transactions with tokens. The method may include providing instructions for generating a web page. The merchant system may provide the instructions to a payment application. The web page may display a selectable control for requesting secure payment using a financial services account. The merchant system may receive token information from the payment application. This token information may be generated by a financial services system associated with the financial services account in response to a request for secure payment using the selectable control. The token information may correspond to the request for secure payment. The token information may replace at least a portion of static information identifying the financial services account. The merchant system may communicate the token information to the financial services system to effectuate the secure payment using the financial services account.

Certain exemplary disclosed embodiments may include a method using a financial services system for authenticating electronic financial transactions with tokens. The method may include receiving a request for secure payment using the financial services account. The request may be received by a financial services system associated with a financial services account. The request may be from a digital wallet. The financial services system may generate a single-use token corresponding to the request for secure payment in response to the request for secure payment. The single-use token may include token information configured to replace static information identifying the financial services account. The financial services system may provide the single-use token to the digital wallet. The financial services system may receive token information from a merchant system. The received token information may replace at least a portion of the static information identifying the financial services account. The financial services system may authenticate the request for secure payment, the authentication at least partly based on the received token information and the generated token information. The financial services system may effectuate secure payment using the financial services account.

In certain aspects, a user-associated device may implement the digital wallet and a payment device may implement the payment application. The disclosed methods may further include determining the proximity of the user-associated device and the payment device to authenticate the request for secure payment. Determining that a short-range network connects the user-associated device and the payment device may establish the proximity of the user-associated device and the payment device. The short-range network may comprise a local area network, a personal area network, a near field network, or a computer bus. The short-range network may be wireless. The short-range network may be a Wi-Fi or similar network. The short-range network may be a Bluetooth link. Determining a geographic location of one or more of the user-associated device or the payment device may establish the proximity of the user-associated device and the payment device. The determination of a geographic location may depend on global positioning system (GPS) information. The determination of a geographic location may depend on cellular network information. The determination of a geographic location may depend on IP address information. The determination of a geographic location may depend on information associated with a wireless access point, such as Wi-Fi router.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
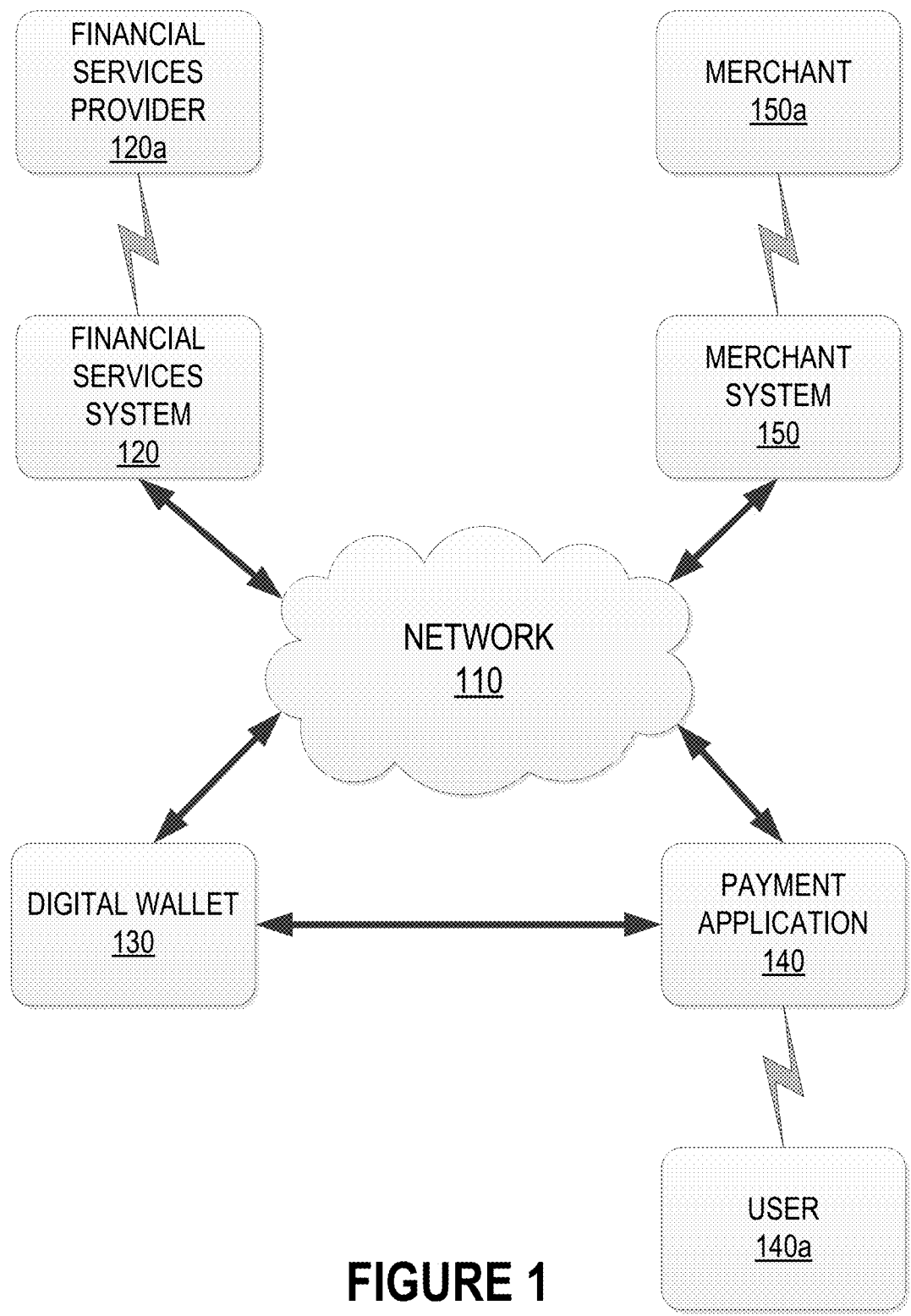
FIG. 1 depicts a schematic illustrating an exemplary authentication system for authenticating financial transactions using a token.

FIG. 1 depicts a schematic illustrating an exemplary authentication system 100 for authenticating financial transactions, consistent with disclosed embodiments. Authentication of the financial transaction may require transmission of payment information between payment application 140 and merchant system 150. Such payment information may comprise static information, including information defining and/or describing financial transactions. In certain aspects, static information may include financial data defining and/or describing persistent characteristics of a financial transaction. As a non-limiting example, static information may include account numbers; expiration dates; authentication codes; account holder identifiers, such as account holder names or identification numbers; billing addresses; mailing addresses, and similar data. Account numbers may include credit card numbers. Authentication codes may include card security codes, including, but not limited to, card verification codes (CVCs). One of skill in the art would recognize that the disclosed embodiments are not limited to these disclosed items or categories of static information. Indeed, disclosed embodiments are not limited to financial transactions but instead may be applied to authentication in any industry.

Authentication system 100 may be configured to authenticate financial transactions using tokens, consistent with disclosed embodiments. For example, as described in greater detail with respect to FIG. 4 below, payment application 140 may be configured to request secure execution of a financial transaction between payment application 140 and merchant system 150 using a financial services account provided by financial services system 120.

As used herein, tokens may comprise data structures or objects containing token information, consistent with disclosed embodiments. In various aspects, token information may comprise plaintext representations of one more items of static information. In some aspects, the static information may be associated with a financial services account. For example, token information may comprise a billing address. In some aspects, token information may comprise an arbitrary representation of one more items of static information. For example, token information may comprise an arbitrary word, number, or sequence of characters. For example, a randomly generated string of alphanumeric characters may correspond to a credit card number. As an additional example, an entire transaction may be represented by a sequential number unrelated to the content of the static information. Token information may concern one or more items of static information. For example, token information may include a randomly generated string of alphanumeric characters corresponding to a credit card number and a plaintext representation of an account holder name and shipping address. As an additional example, token information may represent an entire transaction. Consistent with disclosed embodiments, tokens may be single-use tokens. In certain aspects, tokens may be reused for a limited duration or number of transactions.

In certain aspects, payment application 140 may request secure execution of the transaction from digital wallet 130. Digital wallet 130 may be configured to request secure execution of the transaction from financial services system 120. In various aspects, payment application 140 may request secure execution of the transaction from financial services system 120. In response to the request for secure execution of the transaction, financial services system 120 may be configured to generate at least one token corresponding to the requested financial transaction. The token may be a single-use token. As described below, the token may comprise token information, which may be single-use token information. Financial services system 120 may be configured to provide the token to digital wallet 130. Digital wallet 130 may be configured to provide the token to payment application 140. Payment application 140 may be configured to provide token information to merchant system 150 in place of at least a portion of the required static information. Merchant system 150 may provide the token information to the financial services system 120. Financial services system 120 may authenticate the transaction based at least in part on the received token information. Financial services system 120 may be configured to provide an indication of authentication to merchant system 150. In some aspects, financial services system 120 may be configured to provide an indication of authentication to payment system 140. In certain aspects, merchant system 150 may be configured to provide an indication of authentication to payment system 140.

Network 110 may be configured to provide communications between components of FIG. 1. For example, network 110 may be any type of network (including infrastructure) that provides communications, exchanges information, and/or facilitates the exchange of information, such as the Internet, a Local Area Network, or other suitable connection(s) that enables system 100 to send and receive information between the components of system 100.

Financial services system 120 may be a system associated with financial services provider 120a that provides and/or manages financial services accounts, such as a bank, credit card company, brokerage firm, etc. In some embodiments, financial services system 120 may be configured to execute stored software instructions to perform one or more methods consistent with the disclosed embodiments. In certain embodiments, financial services system 120 may be configured as a particular apparatus or system based on the storage, execution, and/or implementation of the software instructions. Financial services system 120 may include one or more computing systems, such as servers, general purpose computers, or mainframe computers. Financial services system 120 may be stand-alone, or it may be part of a subsystem, which may be part of a larger system. For example, financial services system 120 may include distributed servers that are remotely located and communicate over a public network (e.g., network 110) or a dedicated private network of the financial services provider 120a. In some embodiments, financial services system 120 may be implemented at least in part as a virtual system on a cloud-computing infrastructure. Consistent with disclosed embodiments, financial services system 120 may include or communicate with one or more storage devices configured to store data and/or software instructions. The stored data and/or software instructions may include one or more software programs. Financial services system 120 may execute the stored one or more software programs to perform one or more methods consistent with the disclosed embodiments. In certain aspects, financial services system 120 may execute the stored one or more software programs remotely from financial services system 120. For example, financial services system 120 may access one or more remote devices to execute the stored one or more software programs.

Financial services provider 120a may be associated with financial services system 120, consistent with disclosed embodiments. Financial services provider 120a may provide financial services products for customers (e.g., user 140a). In some aspects, financial services provider 120a may provide and/or manage financial services accounts for customers (e.g., user 140a). Financial services accounts may include, for example, credit card accounts, checking accounts, savings accounts, loans, investment accounts, loyalty programs, and the like. Financial services provider 120a may use one or more computing systems, including financial services system 120, to authorize transactions concerning financial services accounts provided for customers (e.g., user 140a).

Digital wallet 130 may be an application configured to run on a computer system, consistent with disclosed embodiments. In some embodiments, digital wallet 130 may be configured to provide digital access to static information of a user (e.g., user 140a). For example, digital wallet 130 may be configured to provide digital access to personal information and financial account information of a user, such a billing address and credit card account information. In certain aspects, digital wallet 130 may be configured to store static information on a device of the user, such as a mobile device or a personal computer. In certain aspects, digital wallet 130 may be configured to access static information stored on a financial services system (e.g., financial services system 120). As discussed below with respect to FIG. 2A and FIG. 2B, digital wallet 130 may be configured to provide static information to other applications. In certain aspects, digital wallet 130 may be configured to provide static information to applications running on a device associated with both applications. In some aspect, digital wallet 130 may be configured to provide static information to applications running on devices on a common network. In various aspects, digital wallet 130 may be configured to provide static information to applications running on devices within a shared geographic area. In some embodiments, digital wallet 130 may be configured to require credentials authenticating user 140a. Credentials may be required before digital wallet 130 may be used for secure transfer (e.g., payment). For example, digital wallet 130 may require user 140a to enter one or more of a password or username before digital wallet 130 may be used for secure payment. Digital wallet 130 may be configured for communication with components of system 100 over network 110.

Payment application 140 may comprise an application configured to request static information of a user (e.g., user 140a), consistent with disclosed embodiments. In certain aspects, payment application 140 may request static information in connection with a proposed financial transaction. For example, payment application 140 may request billing information and credit card information in connection with a proposed credit card transaction. In certain aspects, payment application 140 may comprise a stand-alone application. As a non-limiting example, payment application 140 may comprise a digital distribution platform, a digital media store, shopping application, auction site, currency exchange application, money transfer application, or similar application known to one of skill in the art. In various aspects, payment application 140 may comprise a plugin that extends the functionality of another application. For example, payment application 140 may comprise a web browser plug-in, which may interact with instructions on a webpage to generate a request for static information. In some embodiments, payment application 140 may be configured to receive static information concerning the financial services account. For example, payment application 140 may be configured to receive static information concerning the financial services account from digital wallet 130. In some embodiments, payment application 140 may be configured to require credentials authenticating user 140a. Credentials may be required before payment application 140 may be used for secure payment. For example, payment application 140 may require user 140a to enter one or more of a password or username before digital wallet 130 may be used for secure payment. Payment application 140 may be configured for communication with components of system 100 over network 110.

User 140a may be a person associated with a financial services account provided by financial services provider 120a. In some embodiments, user 140a may be a person authorized to conduct transactions using the financial services account. For example, user 140a may be the owner of the financial services account. As another example, user 140a may have authority to conduct transactions using the financial services account. This authority may derive from the owner of the financial services account.

Merchant system 150 may comprise a system for collecting payment information, consistent with disclosed embodiments. Merchant system 150 may include one or more computing systems, such as servers, general purpose computers, or mainframe computers. Merchant system 150 may be stand-alone, or it may be part of a subsystem, which may be part of a larger system. For example, merchant system 150 may include distributed servers that are remotely located and communicate over a public network (e.g., network 110) or a dedicated private network of the merchant 150a. In some embodiments, merchant system 150 may be associated with merchant 150a. Merchant system 150 may be configured for communication with components of system 100 over network 110.

Merchant 150a may comprise one or more entities doing business consistent with the disclosed embodiments. In certain aspects, merchant 150a may use one or more computing systems, including merchant system 150, to provide digital platforms for selling goods and/or services. For example, merchant 150a may use merchant system 150 to implement at least one digital distribution platform. As a non-limiting example, the at least one digital distribution platform may be configured to sell, license, or otherwise provide games, applications, and media content. In certain aspects, merchant 150a may use merchant system 150, to provide websites. As a non-limiting example, the websites may be configured to offer e-commerce functionality. For example, the websites may be configured to offer goods and/or services for sale.

Figure 2A:
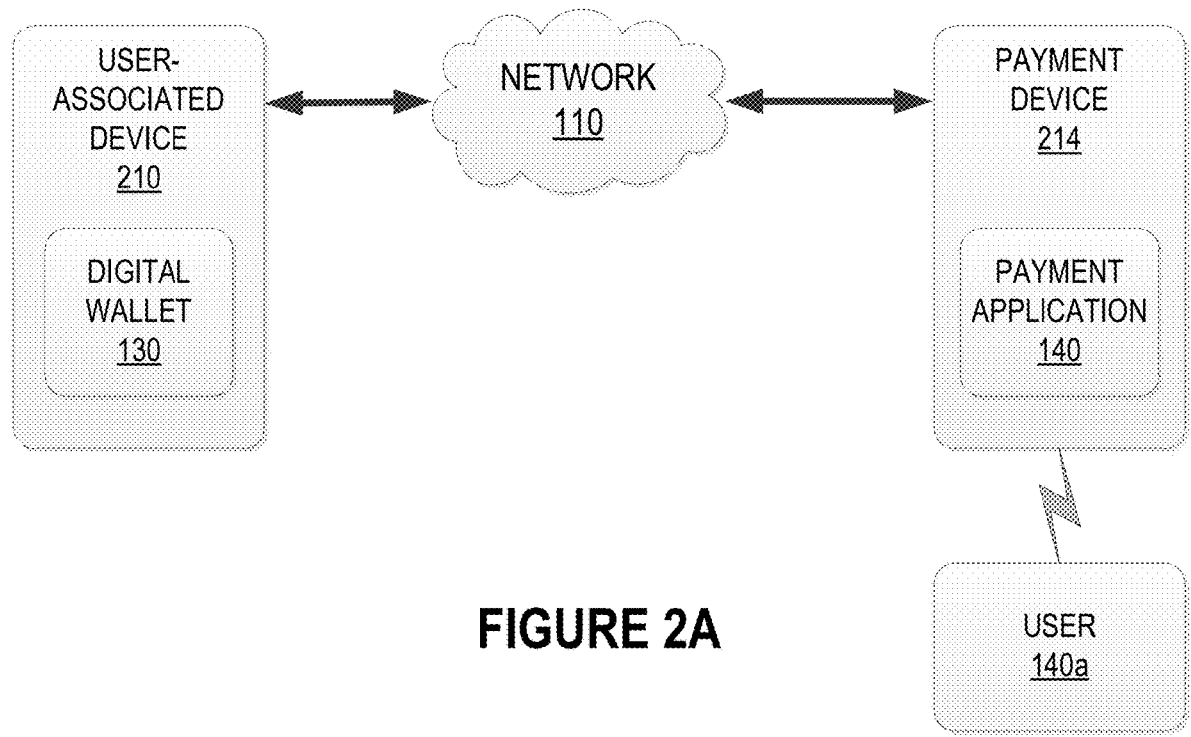
FIG. 2A depicts a schematic illustrating a user-associated device and a payment device according to some embodiments.

FIG. 2A depicts a schematic illustrating user-associated device 210 and payment device 214, consistent with disclosed embodiments. In some embodiments, user-associated device 210 may be connected to payment device 214 over local network 212. In certain aspects, user 140a may interact with payment device 214 to cause payment application 140 to request secure execution of a financial transaction.

User-associated device 210 may comprise a device typically carried on or about the person of a user (e.g., user 140a), consistent with disclosed embodiments. In certain aspects, user-associated device 210 may be a mobile device. For example, user-associated device 210 may be a mobile phone, such as a smartphone; a tablet computer; a portable computer; a smartcard; or a wearable device, such as a smartwatch, optical head-mounted display (OHMD), etc. The location of user-associated device 210 may indicate the location of user 140a. For example, the location of a smartwatch may indicate the location of a user of the smartwatch. In some embodiments, user-associated device 210 may implement digital wallet 130.

User-associated device 210 may be capable of providing location information, consistent with disclosed embodiments. For example, user-associated device 210 may include a GPS receiver. The GPS receiver may receive location information for determining a geographic location of user-associated device 210. As an additional example, a geographic location of a cellular device, such as a mobile phone or tablet, may be identified using a cellular network signal of the mobile phone or tablet, as would be known by one of skill in the art. As a further example, a geographic location of an internet-connected device may be identified using an Internet Protocol (IP) address of the internet-connected device, as would be known by one of skill in the art.

Local network 212 may comprise a short-range network, consistent with disclosed embodiments. In some aspects, the short range network may comprise a Local Area Network (LAN). For example, user-associated device 210 and/or payment device 214 may be wirelessly connected to the LAN, for example using a Wi-Fi network. As an additional example, user-associated device 210 and/or payment device 214 may have a wired connection to the LAN. In certain aspects, the short range network may comprise a personal area network. The personal area network may be wireless, and may be implemented using one or more of infrared or radio frequency communication. For example, the personal area network may be implemented using Bluetooth. In various aspects, the short range network may comprise a near field network. The near field network may be implemented using magnetic induction to communicate information between user-associated device 210 and payment device 214. The implementation may comply with a standard, such as the standard described by ECMA-340 and ISO/IEC 18092, or similar standards known to one of skill in the art. In some aspects, short range network may comprise a computer bus. For example, the short range network may be implemented in one or more of Universal Serial Bus (USB), FireWire, or a similar interface standard known to one of skill in the art. In some aspects, user-associated device 210 may be configured to automatically pair with payment device 214 once within range of the short range network. Manual interaction with one or more of the user-associated device 210 or the payment device 214 may create an automatic pairing between the user-associated device 210 and the payment device 214. For example, one or more of digital wallet 130 or payment application 140 may be configured to instruct user 140a to interact with user-associated device 210 and payment device 214 to create a Bluetooth link between these devices. Subsequently, when within range, user-associated device 210 may automatically connect to payment device 214 using Bluetooth.

Payment device 214 may comprise a device configured for providing payment information to merchant system 150, consistent with disclosed embodiments. In some embodiments, payment device 214 may comprise a personal computer. In certain aspects, the personal computer may implement a web browser, such as Chrome™, Internet Explorer®, Firefox®, or Opera™. As described above with reference to FIG. 1, payment application 140 may comprise a web browser plug-in. Payment application 140 may extend the functionality of the web browser. In certain aspects, as described above with reference to FIG. 1, the personal computer may implement payment application 140 as a stand-alone application. In some embodiments, payment device 214 may comprise a point-of-sale ("POS") terminal.

Figure 2B:
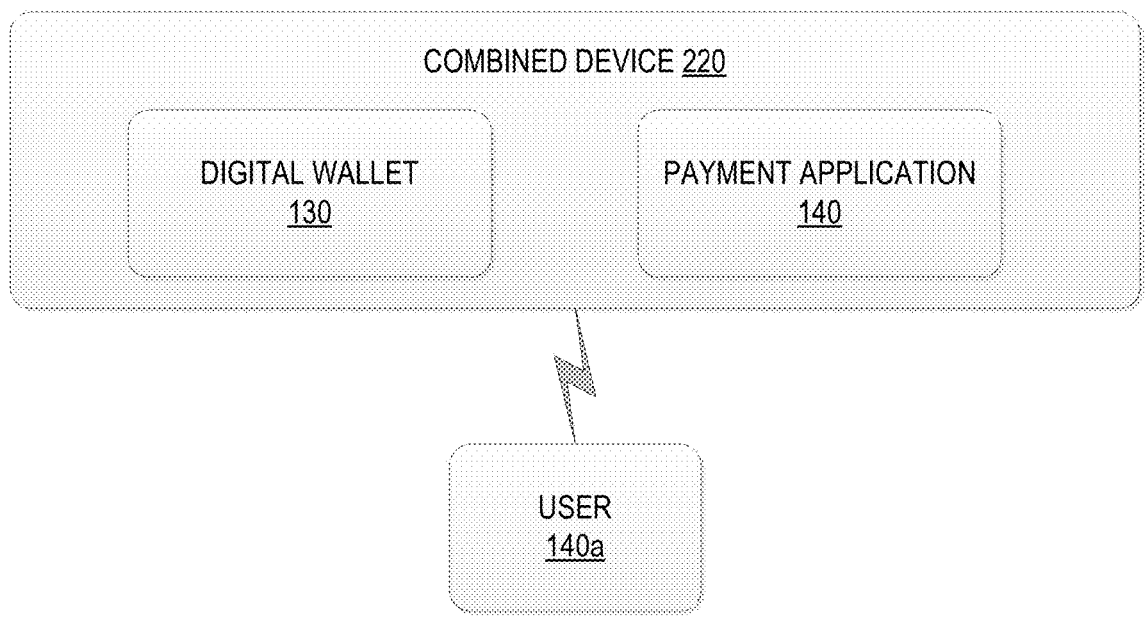
FIG. 2B depicts a schematic illustrating a combined device according to some embodiments.

FIG. 2B depicts a schematic illustrating combined device 220, consistent with disclosed embodiments. In certain aspects, user 140a may interact with combined device 220 to cause payment application 140 to request secure execution of a financial transaction. In some embodiments, combined device 220 may comprise a mobile device. For example, combined device 220 may be a mobile phone, such as a smartphone; a tablet computer; a portable computer; a smartcard; or a wearable device, such as a smartwatch, OHMD, etc. In certain aspects, combined device 220 may implement both digital wallet 130 and payment application 140. Combined device 220 may implement a web browser, such as Chrome™ Internet Explorer®, Firefox®, or Opera™. As described above with reference to FIG. 1, payment application 140 may comprise a web browser plug-in. Payment application 140 may extend the functionality of the web browser. In certain aspects, as described above with reference to FIG. 1, combined device 220 may implement payment application 140 as a stand-alone application. Combined device 220 may be configured to enable digital wallet 130 to communicate with payment application 140, according to methods known to one of skill in the art.

Figure 3:
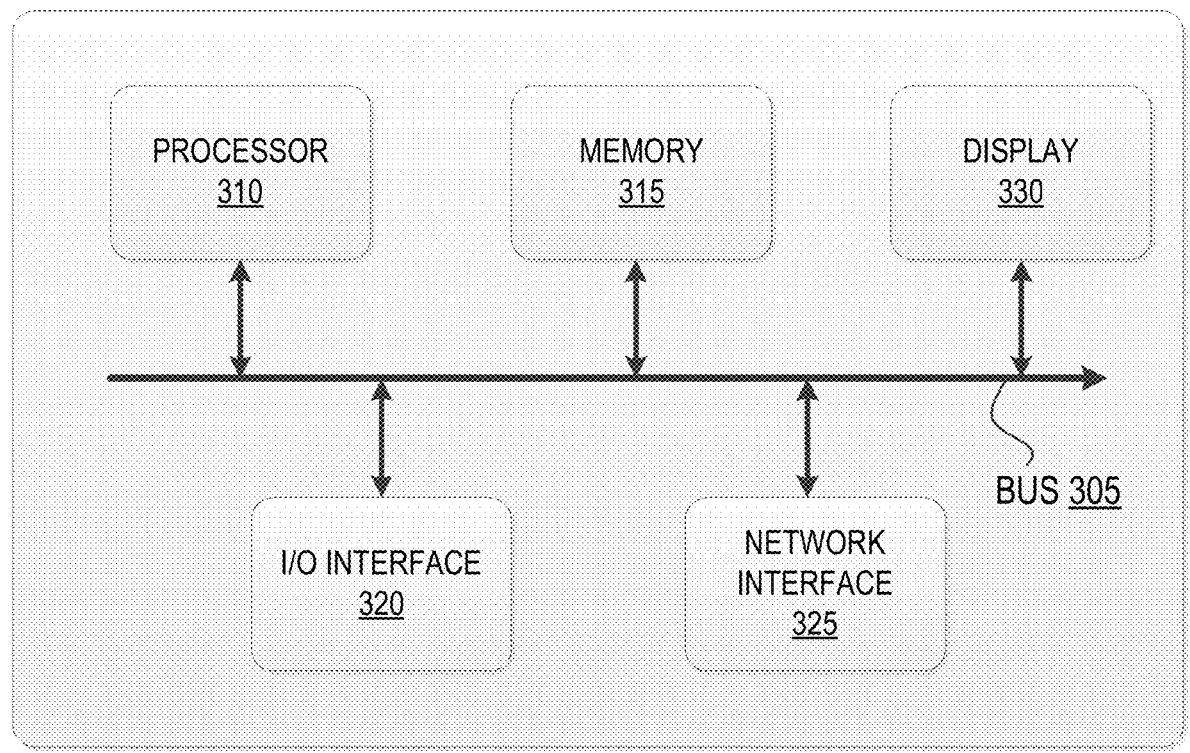
FIG. 3 depicts a diagram illustrating components of an exemplary device according to some embodiments.

FIG. 3 depicts a diagram illustrating components of an exemplary device according to some embodiments. One or more of user-associated device 210, payment device 214, or combined device 220, may be generally implemented as illustrated by FIG. 3. According to some embodiments, the exemplary device may include a processor 310, memory 315, input/output (I/O) interface(s) 320, and network adapter 325. These units may communicate with each other via bus 305, or wirelessly. The components shown in FIG. 3 may reside in a single device or multiple devices.

Processor 310 may be one or more microprocessors, central processing units, or graphics processing units performing various methods in accordance with disclosed embodiments. Memory 315 may include one or more computer hard disks, random access memory, removable storage, or remote computer storage. In various embodiments, memory 315 stores various software programs executed by processor 310. I/O interfaces 320 may include a keyboard, a mouse, an audio input device, a touch screen, or similar human interface device. Network adapter 325 enables the exemplary device to exchange information with components of FIG. 1 over network 110. In various embodiments, network adapter 325 may be configured to support wireless or wired networks. In certain aspects, network adapter 325 may be configured with modules for supporting one or more local area networks, personal area networks, or near field networks. In some aspects, network adapter 325 may be configured with hubs for supporting computer busses. For example, network adapter 325 may be configured with one or more USB hubs.

Figure 4:
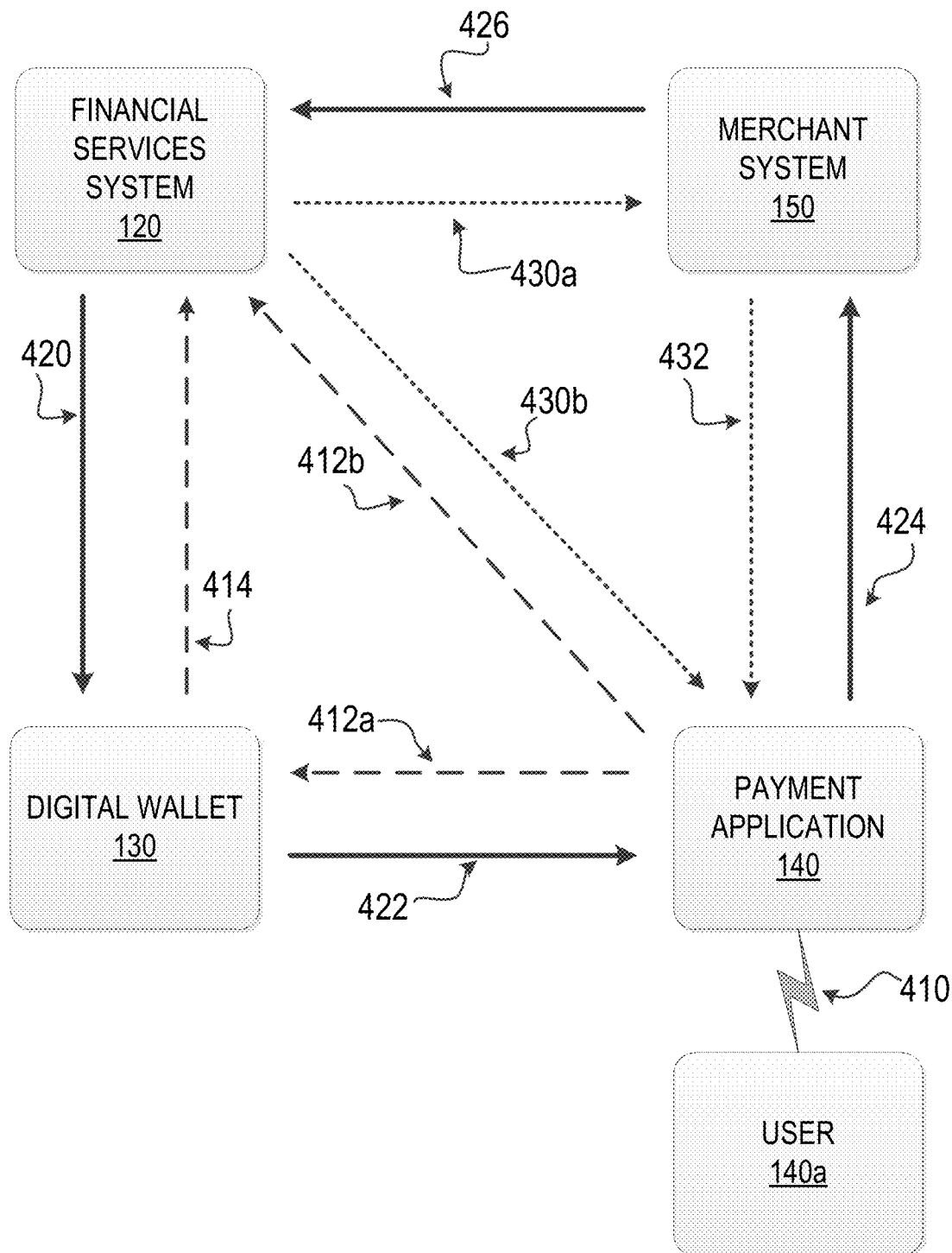
FIG. 4 depicts a flowchart illustrating an exemplary process for secure payment using a token.

FIG. 4 depicts a flowchart illustrating an exemplary process for secure payment using a token, consistent with disclosed embodiments. User 140a may interact with payment application 140 to request secure payment (step 410). As described above with respect to FIG. 2A, payment device 214 may be configured to implement payment application 140. As a non-limiting example, payment application 140 may be configured to cause payment device 214 to display an application interface or web page containing a selectable display element. Payment application 140 may receive a selection of the display element to request a secure transaction. In certain aspects, payment application 140 may receive the selection of the display element using an I/O interface of payment device 214, such as I/O interface 320. As a non-limiting example, user 140a may operate a mouse, touchscreen, or keyboard to provide payment application 140 with the selection. In various aspects, payment application 140 may receive a request for secure payment from user 140a using network adaptor 325. For example, based on user 140a interacting with another device (e.g., user-associated device 210), payment application 140 may generate a request for secure payment that is then provided to payment device 214 over network 212 using network adaptor 325.

As described above with respect to FIG. 2B, combined device 220 may be configured to implement payment application 140. As a non-limiting example, payment application 140 may be configured to cause combined device 220 to display an application interface or web page containing a selectable display element. Combined device 220 may receive a selection of the display element to request a secure transaction. In certain aspects, combined device 220 may receive the selection of the display element using an I/O interface of combined device 220, such as I/O interface 320. As a non-limiting example, combined device 220 may receive the selection when user 140a operates a mouse, touchscreen, or keyboard to select the display element. In various aspects, user 140a may select the display element using a network adaptor of combined device 220, such as network adaptor 325.

Payment application 140 may be configured to communicate the request for secure payment to digital wallet 130, consistent with disclosed embodiments (step 412a). In certain aspects, combined device 220 may be configured to implement payment application 140 and digital wallet 130. Combined device 220 may be configured to pass information between payment application 140 and digital wallet 130 according to methods known to one of skill in the art. In some aspects, payment application 140 may be configured to communicate the request to digital wallet 130 using local network 212. In some embodiments, payment application 140 may communicate the request for secure payment directly to financial services system 120, consistent with disclosed embodiments (step 412b). As a non-limiting example, payment application 140 may communicate the request for secure payment using a web service published by financial services system 120. One of skill in the art would appreciate that multiple methods, protocols, and formats may be used to communicate the request for secure payment directly to financial services system 120 without departing from the disclosed embodiments.

Digital wallet 130 may be configured to communicate the request for secure payment to financial services system 120, consistent with disclosed embodiments (step 414). As a non-limiting example, digital wallet 130 may communicate the request for secure payment using a web service published by financial services system 120. One of skill in the art would appreciate that multiple methods, protocols, and formats may be used to communicate the request for secure payment directly to financial services system 120 without departing from the envisioned embodiments.

Financial services system 120 may be configured to generate a one-time use token, consistent with disclosed embodiments. In some embodiments, financial services system 120 may generate the token in response to the request for secure payment. In certain aspects, the token may comprise a data structure suitable for automatically transferring information between computer systems, such as an XML document, JSON object, or SOAP message. One of skill in the art would recognize that other data structures may be used without departing from the envisioned embodiments. In some embodiments, financial services system 120 may communicate the token to digital wallet 130, consistent with disclosed embodiments (step 420).

The token may comprise token information, consistent with disclosed embodiments. In certain aspects, the token information may correspond to static information associated with the financial services account. For example, the token information may correspond to account holder information. Account holder information may include an account holder identifier, such as an account holder name or identification number. Account holder information may include one or more of a billing address, a shipping address, a telephone number, email address, or other account holder attributes relevant to completing an online transaction. As an additional example, the token information may correspond to account information. Account information may comprise an account number, a security code, and/or an expiration date. Authentication codes may include card security codes, including, but not limited to, CVC codes. For example, account information may include one or more of a credit card number, credit card expiration date, or CVC code.

In certain embodiments, financial services system 120 may generate one or more tokens prior to receiving a request for secure payment. Financial services system 120 may provision digital wallet 130 with one or more tokens for authenticating secure payments. In certain aspects, digital wallet 130 may provide at least one of the provisioned tokens to payment application 140 in response to a request for secure payment. For example, digital wallet 130 may provide at least one of the provisioned tokens to payment application 140, before communicating the request for secure payment to financial services system 120.

Digital wallet 130 may communicate the token to payment application 140, consistent with disclosed embodiments (step 422). As discussed with reference to FIG. 2A, in some embodiments, user-associated device 210 may implement digital wallet 130. Payment device 214 may implement payment application 140. Consistent with disclosed embodiments, digital wallet 130 may communicate the token to payment application 140 using local network 212. As would be recognized by one of skill in the art, the protocol and content for transmitting the token may depend on the implementation of local network 212. As would be recognized by one of skill in the art, the protocol and content for transmitting the token are not intended to be limiting. As described in detail above with respect to FIG. 2B, in some embodiments, combined device 220 may be configured to implement both digital wallet 130 and payment application 140. Combined device 220 may be configured by one more of digital wallet 130 or payment application 140 to provide the token to payment application 140 according to methods known to one of skill in the art.

In some embodiments, authentication system 100 may be configured to determine whether user-associated device 210 is proximate to payment device 214. For example, one or more of digital wallet 130 or payment application 140 may be configured to make this determination. The presence of user-associated device 210 and payment device 214 on local network 212 may establish proximity, consistent with disclosed embodiments. As described in detail above with respect to FIG. 2A, local network 212 may comprise a local area network, personal area network, near field network, or computer bus. For example, proximity may be established by a Bluetooth link connecting user-associated device 210 and payment device 214. As an additional example, proximity may be established by an electromagnetic inductive link connecting user-associated device 210 and payment device 214. As a further example, proximity may be established by the presence of user-associated device 210 and payment device 214 on a common wireless local area network, such as a Wi-Fi network For example, user-associated device 210 and payment device 214 may be connected to the same wireless access point, such as a Wi-Fi router.

Geographic location information may establish proximity, consistent with disclosed embodiments. In certain aspects, geographic location information may be available for one or more of user-associated device 210 or payment device 214. For example, the geographic location of one or more of user-associated device 210 or payment device 214 may be predetermined. For example, payment device 214 may be a POS terminal having a known location. In certain aspects, one or more of user-associated device 210 or payment device 214 may be configured to provide geographic location information. For example, one or more of user-associated device 210 or payment device 214 may be configured to provide geographic location information using a GPS receiver. As an additional example, one or more of user-associated device 210 or payment device 214 may be configured to provide geographic location information based on a cellular network signal. As further example, one or more of user-associated device 210 or payment device 214 may be configured to provide geographic location information based on IP address information. For example, payment device 214 may be a POS terminal having a predetermined location, and user-associated device 210 may be configured to provide geographic location information using a GPS receiver.

Authentication system 100 may be configured to deny the request for secure payment unless conditions are satisfied, consistent with disclosed embodiments. In some embodiments, authentication system 100 may be configured to deny the request for secure payment based on a status of digital wallet 130. For example, authentication system 100 may be configured to require that digital wallet 130 be running. As a further example, authentication system 100 may be configured to require that digital wallet 130 be currently open, maximized, selected, or the like. In certain embodiments, authentication system 100 may be configured to deny the request for secure payment unless user-associated device 210 is proximate to payment device 214. In certain aspects, financial services system 120 may be configured to deny the request for secure payment. In some aspects, digital wallet 130 may be configured to deny the request for secure payment. In various aspects, payment application 140 may be configured to deny the request for secure payment. As a non-limiting example, denial of the request for secure payment may comprise not communicating or receiving the request for secure payment or the token, or not generating the token in response to receiving the request for secure payment. As an additional non-limiting example, denial of the request for secure payment may include providing an indication of the denial to user 140a (via, e.g., payment device 214 or combined device 220). In various embodiments, authentication system 100 may be configured to require authentication of user 140a. In certain aspects, digital wallet 130 may be configured to require authentication of user 140a. In certain aspects, digital wallet 130 may be configured to require such authentication before communicating a request for secure payment to financial services system 120 (step 414). In certain aspects, digital wallet 130 may be configured to require such authentication before communicating a token to payment application 140 (step 422). Digital wallet 130 may be configured to accept credentials to authenticate user 140*a*. Credentials may include information confirming the identity of user 140*a*. As a non-limiting example, credentials may include one or more of a user name or password associated with user 140*a*. As an additional non-limiting example, credentials may include an authentication token provided by an authentication server. The particular method of authentication is not intended to be limiting, as would be recognized by one of skill in the art. In various aspects, payment application 140 may be configured to require authentication of user 140*a*. In certain aspects, payment application 140 may be configured to require such authentication before communicating a request for secure payment to digital wallet 130 (step 412*a*), or financial services system 120 (step 412*b*). Payment application 140 may be configured to accept credentials to authenticate user 140*a*. Credentials may include information confirming the identity of user 140*a*. As a non-limiting example, credentials may include one or more of a user name or password associated with user 140*a*. As an additional non-limiting example, credentials may include an authentication token provided by an authentication server. The particular method of authentication is not intended to be limiting, as would be recognized by one of skill in the art.

As described above with respect to FIG. 1, authorization of a financial transaction may require communication of static information, such as information defining and/or describing the financial transaction, to merchant system 150. Consistent with disclosed embodiments, payment application 140 may be configured to communicate token information to merchant system 150 in place of at least a portion of otherwise required static information (step 424). In certain aspects, payment application 140 may be configured to communicate the remaining portion of the required static information and the token information. For example, a credit card transaction may require payment application 140 to provide a credit card number. Consistent with disclosed embodiments, payment application 140 may provide token information in place of the credit card number. As an additional example, a credit card transaction may require payment application 140 to provide a CVC code. Consistent with disclosed embodiments, payment application 140 may provide token information in place of the CVC code. As a further example, a credit card transaction may require payment application 140 to provide a billing and/or shipping address. Consistent with disclosed embodiments, payment application 140 may provide token information in place of the billing and/or shipping address. In some embodiments, the token information may replace all of the required static information. For example, the credit card number, expiration date, and CVC code may be replaced by the token information.

In some embodiments, payment application 140 may be configured to communicate token information indirectly to merchant system 150. For example, payment application 140 may be configured to provide token information using one or more web pages. Payment application 140 may be configured to display the one or more web pages according to instructions received from merchant system 150. As described in greater detail with respect to FIG. 6, the one or more web pages may include forms for entering the required static information. In certain aspects, payment application 140 may be configured to autofill the forms with the token information. In various aspects, payment application 140 may be configured to permit user 140*a* to copy the token information into the form from the clipboard of payment device 214 or combined device 220. Payment application 150 may be configured to submit the forms to the merchant system 150.

In some embodiments, payment application 140 may be configured to communicate token information directly to merchant system 150. For example, payment application 140 may be configured to communicate token information using an Application Program Interfaces ("API"). As a non-limiting example, one or more of payment application 140 or merchant system 150 may expose an API for communicating the token information. As a non-limiting example, payment application 140 may communicate the token information using a web service published by one or more of payment application 140 or merchant system 150. In certain aspects, payment application 140 may be configured to communicate the token comprising the token information. In some aspects, payment application 140 may be configured to modify the token, or repackage token information into a new data structure. One of skill in the art would appreciate that multiple methods, protocols, and formats may be used to communicate the token information directly to merchant system 150 without departing from the disclosed embodiments.

Payment application may request confirmation from user 140*a* to communicate one or more of the token information or remaining static information, consistent with disclosed embodiments. For example, payment application 140 may request confirmation from user 140*a* prior to submitting the forms. As an additional example, payment application 140 may request user confirmation prior to directly providing one or more of the token, the token information, or the remaining static information. As a non-limiting example, payment application may request confirmation by displaying a selectable graphical user interface element. As a further non-limiting example, user 140*a* may be presented with a dialog box including an option to confirm communication of the information.

Merchant system 150 may be configured to request authorization for the financial transaction, consistent with disclosed embodiments (step 426). In some embodiments, authorization may be requested from financial services system 120. Requesting authorization may comprise communicating the token information. The token information may be communicating together with any additional static information required to authorize the financial transaction. In certain aspects, merchant system 150 may be configured to communicate the token information directly to financial services system 120. One of skill in the art would appreciate that multiple methods, protocols, and formats may be used to communicate the token information directly to merchant system 150 without departing from the disclosed embodiments. In various aspects, merchant system 150 may be configured to communicate the token information indirectly to financial services system 120. For example, merchant system 150 may be configured to provide the static information to a payment gateway. The payment gateway may be configured to communicate the static information to financial services system 120, as would be familiar to one of skill in the art.

Financial services system 120 may be configured to authorize the transaction, consistent with disclosed embodiments. In some aspects, authorization may depend on the token information and the remaining portion of the required static information. For example, financial services system 120 may be configured to determine whether the received token information matches the token information provided in the token to digital wallet 130 (in step 420). As an additional example, financial services system 120 may be configured to determine whether the received token information is consistent with the received static information. For example financial services system 120 may compare the received static information with corresponding information associated with the token information. For example, financial services system 120 may receive a request for secure payment using a credit card account having a credit card number, expiration date, and CVC code. Financial services system 120 may provide a token comprising token information to digital wallet 130. Financial services system 120 may receive the token information in place of the credit card account number, together with an expiration date and CVC code, from merchant system 150. Financial services system 120 may compare the received expiration date and CVC code with the expiration date and CVC code of the credit card account to determine whether the financial transaction is authorized.

Financial services system 120 may be configured to provide an indication that the financial transaction was authorized, consistent with disclosed embodiments. In some aspects, financial services system 120 may be configured to provide the indication to merchant system 150 (step 430*a*). In some aspects, financial services system 120 may be configured to provide the response directly to merchant system 150. In certain aspects, financial services system 120 may be configured to provide the indication indirectly through a payment gateway. The payment gateway may be configured to communicate the indication from financial services system 120 to merchant system 150, as would be familiar to one of skill in the art. In some aspects, financial services system 120 may be configured to provide the indication to payment application 140 (step 430*b*). In some aspects, merchant system 150 may be configured to provide the indication to payment application 140 (step 432).

Figure 5A:
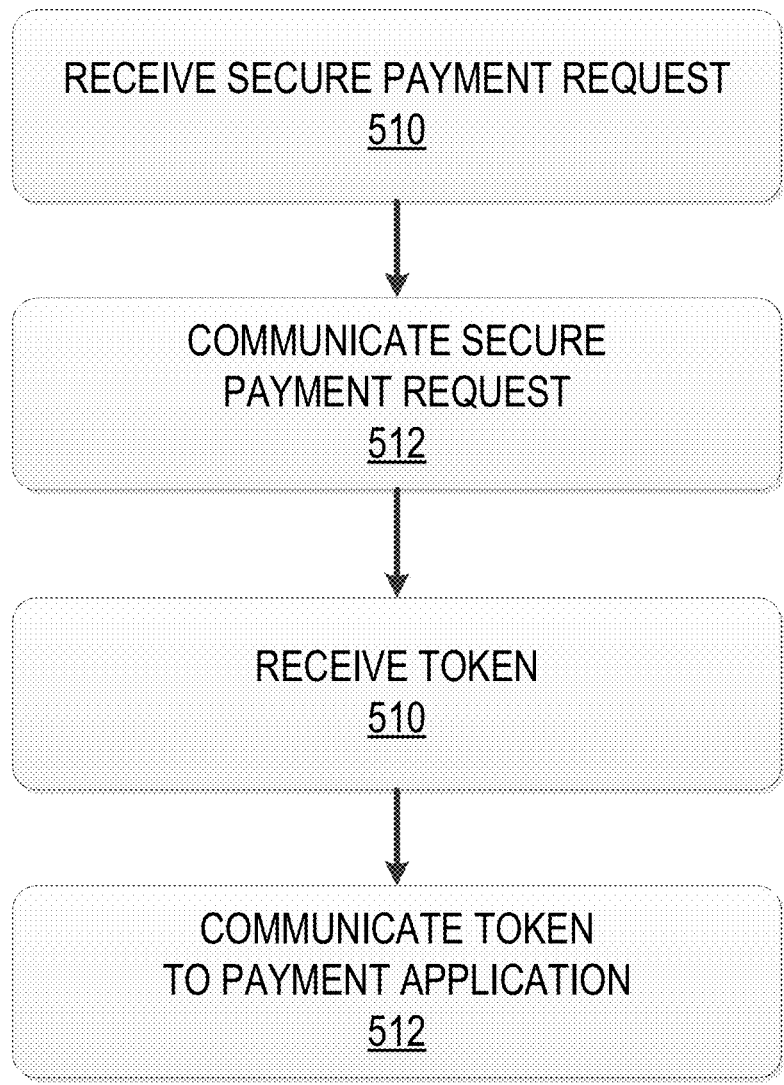
FIGS. 5A-5D depict flowcharts illustrating exemplary processes for secure payment as performed by components of the exemplary authentication system.

FIG. 5A depicts a flowchart illustrating an exemplary process for securing payment performed by digital wallet 130, consistent with disclosed embodiments. Digital wallet 130 may receive a request for secure payment using a financial services account (step 510). This request may be received, for example, from payment application 140. This request may be received through a network adaptor, such as network adaptor 325. In some aspects, user-associated device 210 may implement digital wallet 130 and payment device 214 may implement payment application 140. For example, user-associated device 210 may be a mobile device, such as a mobile phone, laptop computer, tablet computer, wearable computer, etc. As an additional example, payment device 214 may comprise a POS terminal or personal computer running payment application 140 as a web browser plugin. In various aspects, combined device 220 may implement digital wallet 130 and payment application 140. Combined device 220 may be a mobile device, such as a mobile phone, laptop computer, tablet computer, wearable computer, etc.

Digital wallet 130 may communicate the request for secure payment using the financial services account to financial services system 120 (step 512). In response, digital wallet 130 may receive a token from financial services system 120 (step 514). In certain aspects, the token may be generated by financial services system 120 in response to the request for secure payment using the financial services account. Financial services system 120 may be associated with the financial services account. The received token may correspond to the request for secure payment. The received token may comprise token information configured to replace static information identifying the financial services account.

In some aspects, the replaced static information may comprise account holder information, such as an account holder name, a shipping address, or a billing address. In various aspects, the replaced static information may comprise account information, such as an account number, a security code, and/or an expiration date. The account number may comprise a credit card number, and the security code may comprise a CVC code. Digital wallet 130 may provide the token, including token information, to payment application system 150 to effectuate secure payment using the financial services account (step 516).

In some embodiments, digital wallet 130 may determine the proximity of user-associated device 210 and payment device 214 to authenticate the request for secure payment. In some embodiments determining the proximity of user-associated device 210 and payment device 214 may comprise determining that local network 212 connects user-associated device 210 and payment device 214. In certain aspects, local network 212 may comprise one or more of a local area network, a personal area network, a near field network, or a computer bus. In various aspects, local network 212 may be wireless. For example, local network 212 may be a Wi-Fi network. As an additional example, local network 212 may be a Bluetooth link. In various embodiments, determining the proximity of the user-associated device 210 and the payment device 214 may comprise determining or indicating a geographic location of one or more of the user-associated device 210 or the payment device 214. This determination of a geographic location may depend, as a non-limiting example, on GPS information, cellular network information, or IP address information.

Figure 5B:
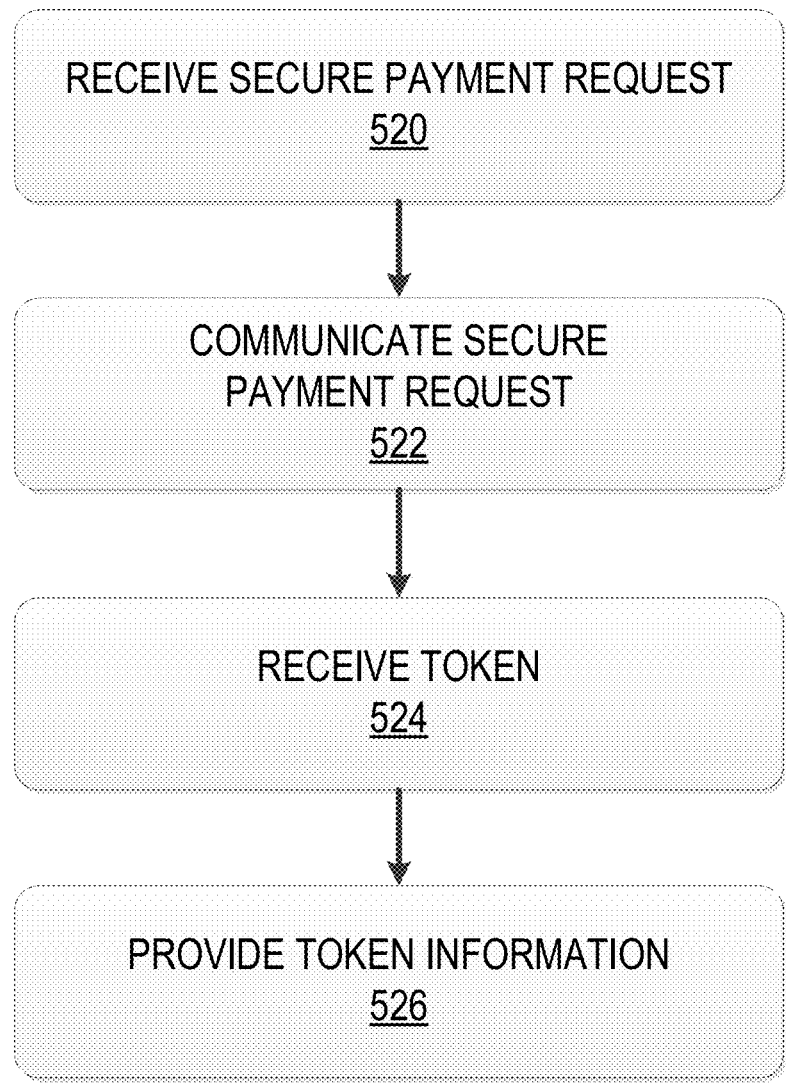

FIG. 5B depicts a flowchart illustrating an exemplary process for secure payment performed by payment application 140, consistent with disclosed embodiments. Payment application 140 may receive request for secure payment using a financial services account (step 520). This request may be received from a user, such as user 140*a*. The request may be received through an I/O interface, such as I/O interface 320. The request may be received through a network adaptor, such as network adaptor 325.

Payment application 140 may communicate the request for secure payment using the financial services account to digital wallet 130 (step 522). In some aspects, user-associated device 210 may implement digital wallet 130 and payment device 214 may implement payment application 140. For example, user-associated device 210 may be a mobile device, such as a mobile phone, laptop computer, tablet computer, wearable computer, etc. As an additional example, payment device may comprise a POS terminal, or personal computer running payment application 140 as a web browser plugin. In various aspects, combined device 220 may implement digital wallet 130 and payment application 140. Combined device 220 may be a mobile device, such as a mobile phone, laptop computer, tablet computer, wearable computer, etc.

Payment application 140 may receive a single use token from digital wallet 130 (step 524). In certain aspects, the single use token may be generated by financial services system 120 in response to the request for secure payment using the financial services account. Financial services system 120 may be associated with the financial services account. The received single use token may correspond to the request for secure payment. The received single use token may comprise token information configured to replace static information identifying the financial services account. In some aspects, the replaced static information may comprise account holder information, such as an account holder name, a shipping address, or a billing address. In various aspects, the replaced static information may comprise account information, such as an account number, a security code, and/or an expiration date. The account number may comprise a credit card number, and the security code may comprise a CVC code. Payment application 140 may provide the token information replacing at least a portion of the static information identifying the financial services account to merchant system 150. In some aspects, the token information may be provided indirectly to merchant system 150. For example, payment application 140 may be configured to autofill a payment form on a web page with the token information. In certain aspects, payment application 140 may expose an API for directly providing the token information to the merchant system. Payment application 140 may provide the token information and remaining static information to merchant system 150 to effectuate secure payment using the financial services account (step 526).

In some embodiments, payment application 140 may determine the proximity of the user-associated device 210 and the payment device 214 to authenticate the request for secure payment. In some embodiments determining the proximity of the user-associated device 210 and the payment device 214 may comprise determining that local network 212 connects user-associated device 210 and payment device 214. In certain aspects, local network 212 may comprise one or more of a local area network, a personal area network, a near field network, or a computer bus. In various aspects, local network 212 may be wireless. For example, local network 212 may be a Wi-Fi network. As an additional example, local network 212 may be a Bluetooth link. In various embodiments, determining the proximity of the user-associated device and the payment device may comprise determining a geographic location of one or more of the user-associated device or the payment device. This determination of a geographic location may depend, as non-limiting examples, on GPS information, cellular network information, or IP address information.

Figure 5C:
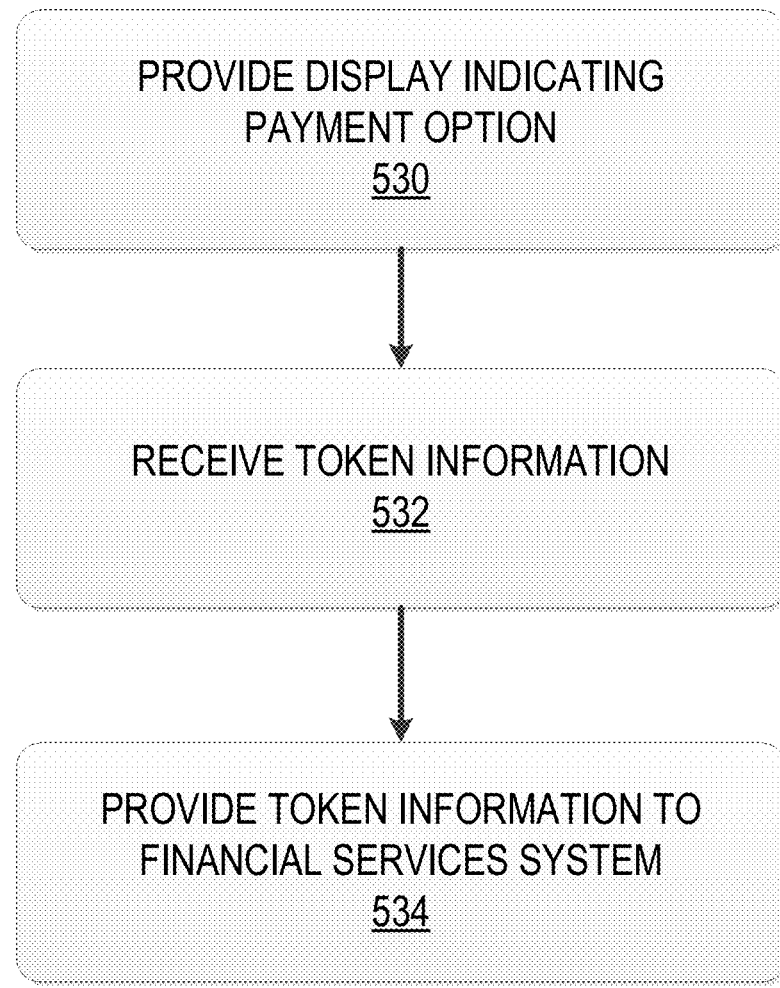

FIG. 5C depicts a flowchart illustrating an exemplary process for secure payment performed by merchant system 150, consistent with disclosed embodiments. In some embodiments, merchant system 150 may provide instructions to payment device 214 or combined device 220 for displaying a user interface, such as a web page (step 530). In certain aspects, the user interface may include controls for entering static information required for a financial transaction. For example, for a credit card transaction, the user interface may include text boxes for entering the name and address of the account holder, the account number, and the CVC code. The user interface may include a selectable element such as a drop down menu or listbox for entering an expiration date. A control may be provided for submitting the entered static information to merchant system 150. In some aspects, the user interface may include a selectable control for requesting a secure transaction consistent with disclosed embodiments. As would be recognized by one of skill in the art, various user interfaces may be implemented without departing from the scope of the envisioned embodiments.

In certain embodiments, merchant system 150 may receive token information from payment application 140 (step 532). In some embodiments, merchant system 150 may receive the token information indirectly from payment application 140. For example, as described above, merchant system 150 may receive information entered into the user interface. In some embodiments, payment application 140 may be configured to automatically populate the controls for entering static information with the token information. For example, payment application 140 may be configured to autofill token information corresponding to credit card numbers into user interface controls intended for credit card numbers, such as text boxes. In certain embodiments, payment application 140 may be configured to automatically copy the token information to the clipboard of payment device 214 or combined device 220. User 140a may interact with payment device 214 or combined device 220 to copy the token information to corresponding controls in the user interface. For example, one or more of the token or payment device 214 may be configured to cause payment device 214 to copy token information corresponding to a CVC code to the clipboard of payment device 214 for entry into a user interface text field intended for CVC codes. Any necessary remaining static information may be received via the user interface, and both the token information and the necessary remaining static information may be submitted to merchant system 150.

In certain embodiments, merchant system 150 may receive the token information directly from payment application 140. In certain aspects, one or more of payment application 140 or merchant system 150 may expose an API enabling communication of the token information. For example, merchant system 150 may publish a web service enabling communication of the token information. In some aspects, payment application 140 may communicate the token comprising the token information. In various aspects, the token information may be provided separately from the token. In some aspects, merchant system 150 may provide instructions causing one or more of payment device 214 or combined device 220 to display a user interface including a selectable element for initiating the direct transfer of information to merchant system 150.

In certain embodiments, merchant system 150 may provide token information to financial services system 120 (step 534). In some embodiments, merchant system 150 may provide token information to financial services system 120 directly. In certain embodiments, merchant system 150 may provide token information to financial services system 120 indirectly, for example through a payment gateway, according to methods known in the art.

Figure 5D:
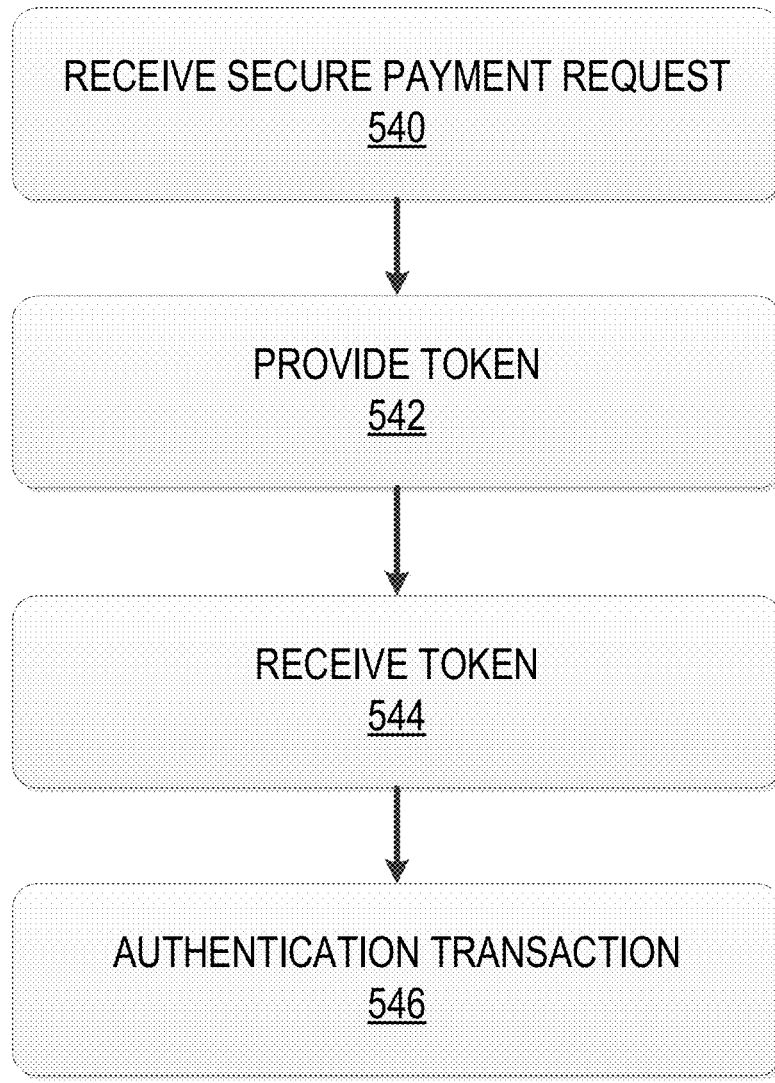

FIG. 5D depicts a flowchart illustrating an exemplary process for secure payment performed by financial services system 120, consistent with disclosed embodiments. Financial services system 120 may receive request for secure payment using a financial services account (step 540). In some aspects, financial services system 120 may be associated with the financial services account. In certain aspects, this request may be received from digital wallet 130. In various aspects, this request may be received from payment application 140. The request may be received through an API exposed by financial services system 120. Financial services system 120 may make the API available using a web services interface.

Financial services system 120 may generate a token corresponding to the request for secure payment. The token may be a single-use token. The token may comprise token information configured to replace static information identifying the financial services account. The token information may be single-use token information. In certain aspects, the replaced static information may comprise account holder information, such as an account holder name, a shipping address, and/or a billing address. In various aspects, the replaced static information may comprise account information, such as an account number, a security code, and/or an expiration date. For example, the account number may comprise a credit card number. Financial services system 120 may provide the token to digital wallet 130 (step 542).

Financial services system 120 may receive token information from merchant system 150 (step 544). In some aspect, financial services system 120 may receive the token information directly from merchant system 150. In certain aspects, financial services system 120 may receive the token information indirectly from merchant system 150 through a payment gateway, according to methods know in the art. In some aspects, financial services system 120 may receive a token comprising the token information. In certain aspects, the received token information may have been provided in place of at least a portion of the static information required for authentication of the secure transaction. For example, the token information may have been provided in place of a credit card number used for a credit card transaction.

Financial services system 120 may authenticate the secure transaction based at least in part on the token information (step 546). For example, financial services system 120 may compare the token information received from the merchant system 150 with the token information provided to the digital wallet 130. As an additional example, financial services system 120 may determine whether the token information is consistent with the remaining static information provided by merchant system 150. For example, given token information configured to replace a credit card number, financial services system 120 may determine the expiration date and CVC code for the credit card account corresponding to the token information, and compare one or more of the expiration date or CVC code received from merchant system 150 with the expiration date and CVC code for the corresponding credit card account.

Figure 6:
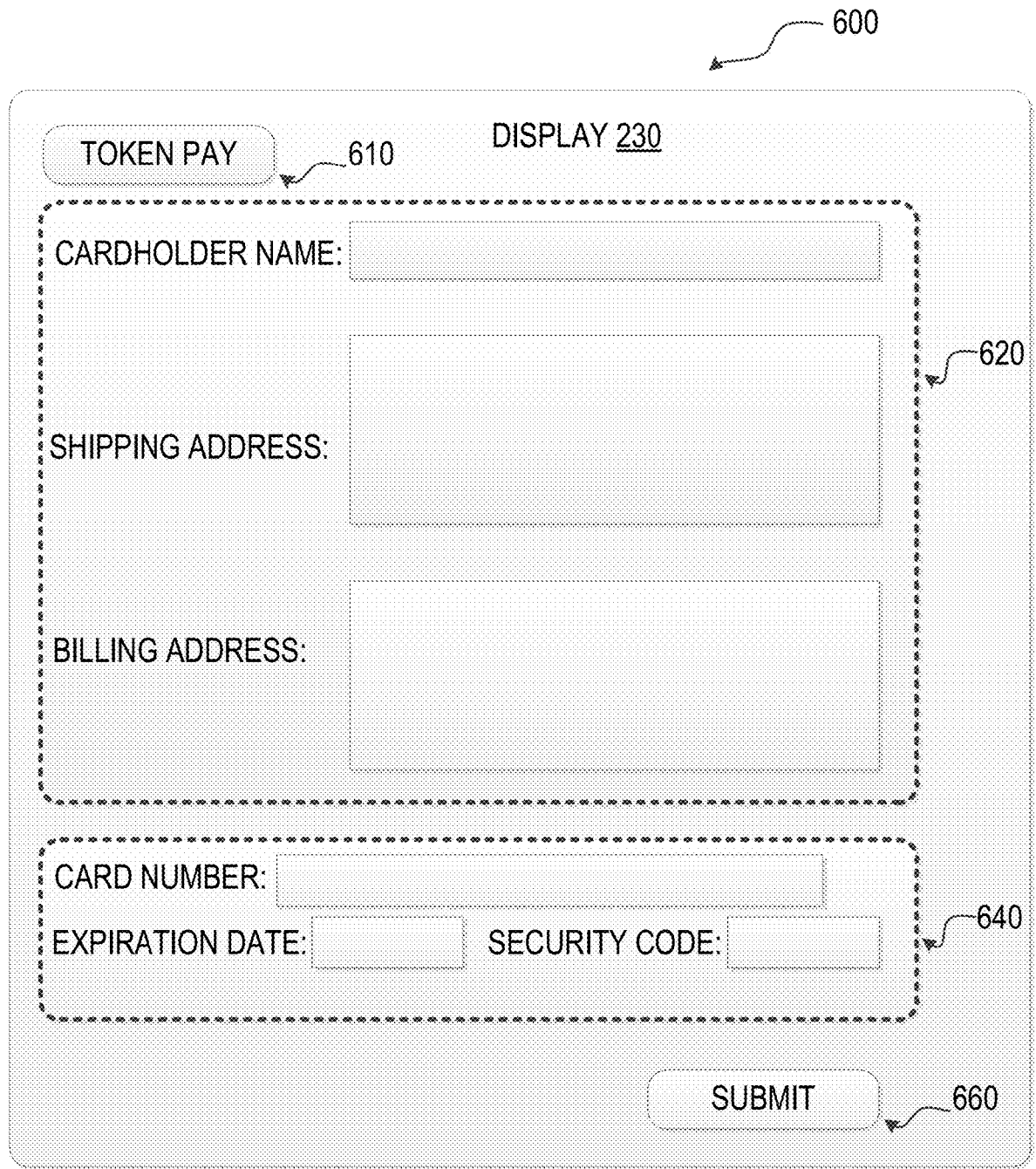
FIG. 6 depicts an exemplary user interface consistent with disclosed embodiments.

FIG. 6 depicts an exemplary user interface 600 consistent with disclosed embodiments. In some embodiments, payment device 214 or combined device 220 may be configured to display user interface 600 in response to instructions provided by merchant system 150. In some aspects, user interface 600 may be a web page rendered by a web browser implemented by payment device 214 or combined device 220. User interface 600 may be configured to display secure pay control 610. As a non-limiting example, payment device 214 or combined device 220 may receive a selection from user 140*a* of secure pay control 610 to request secure payment. In certain aspects, payment application 140 may comprise a browser plugin and secure pay control 610 may comprise code invoking payment application 140. In certain aspects, payment application 140 may directly communicate token information to merchant application 150. Direct communication of token information may follow confirmation from user 140*a*. User interface 600 may display a confirmation dialog confirming communication of token information. In various aspects, payment application 140 may indirectly communicate token information to merchant application 150. In certain aspects, selection of secure pay control 610 may cause payment application to receive a token containing token information and automatically populate account holder information controls 620 and account information controls 640 with the relevant token information. For example, the token information may include the shipping address and a randomly generated card number. The shipping address control of account holder information controls 620 may be automatically populated with the received shipping address. The card number control of the account information controls 640 may be automatically populated with the received randomly generated card number. In certain aspects, the received token information may be copied to the clipboard of payment device 214 or combined device 220. User 140*a* may provide instructions to copy desired token information from the clipboard to the relevant control of user interface 600. For example, token information comprising a randomly generated CVC code and a randomly generated card number may be copied to the clipboard. User interface 600 may be configured to receive instructions provided by user 140*a* to copy the randomly generated CVC code to the security code control of the account information controls 640, and to copy the randomly generated card number to the card number control of the account information controls 640. In some embodiments, user interface 600 may be configured to permit editing of auto-filled or copied token information. User interface 600 may display selectable submission button 660. Payment device 214 or combined device 220 may be configured to provide the information in one or more of the controls comprising account holder information controls 620 or account information controls 640 to merchant system 150 in response to selection of submission button 660. As would be recognized by one of skill in the art, the particular graphical user interface depicted in FIG. 6 is not intended to be limiting.

In some embodiments, payment device 214 or combined device 220 may be configured to authenticate user 140*a* for access to a website using a token, consistent with disclosed embodiments. In certain aspects, user 140*a* may provide instructions for payment device 214 or combined device 220 to access a website using a web browser. For example, the website may be hosted by financial services system 120. Access to the website may require authentication. For example, user 140*a* may be required to provide one or more authentication credentials to access the website. In some aspects, the website may provide instructions for payment device 214 or combined device 220 to display a web page. The web page may include a selectable control. Selection of the control may cause financial services system 120 to generate a token including token information. In certain aspects, the token information may correspond to at least a portion of the authentication credentials. For example, the authentication credentials may include a username and password, and the token information may include a first, randomly generated alphanumeric string corresponding to the user name and a second, randomly generated alphanumeric string corresponding to the password. Financial services system 120 may be configured to provide the token to the device implementing the digital wallet 130, such as user-associated device 210 or combined device 220. In various aspects, digital wallet 130 may be configured to provide the token to the browser. For example, user-associated device 210 may be configured to provide the token to payment device 214 using local network 212. The browser may be configured to provide the token information to financial services system 120 directly. For example, one or more of the browser or the financial services application may be configured to expose an API for transferring the token information. For example, the token may comprise an authentication token, which may be communicated from the browser to the financial services system 120. The browser may be configured to provide the token information to financial services system 120 indirectly. For example the token information may be copied to the clipboard. In response to input from user 140*a*, the browser may be configured to copy the information from the clipboard to relevant controls displayed in the webpage. As an additional example, the browser may be configured to automatically copy the token information to relevant controls displayed in the webpage. In response to input from user 140*a*, the browser may be configured to submit at least a portion of the token information entered into the webpage to financial services system 120.

In some embodiments, financial services system 120 may be configured to compare the token information submitted by the browser to the token information provided to digital wallet 130. Financial services system 120 may be configured to grant access to the browser if the token information submitted by the browser matches the token information provided to the digital wallet 130.

In some embodiments, user-associated device 210 may implement the digital wallet 130 and payment device 214 may implement the browser. In certain aspects, one or more of the financial services system 120, the digital wallet 130, or the browser may require that user-associated device 210 be in proximity to payment device 214. As described above with reference to FIG. 4, one or more of user-associated device 210 or payment device 214 may be configured to determine whether user-associated device 210 is in proximity to payment device 214. Proximity may be established by the presence of both user-associated device 210 and payment device 214 on local network 212. Proximity may also be established based on the geographic location of user-associated device 210 and payment device 214.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method for authenticating an electronic financial transaction using a token, comprising:

receiving, via a digital wallet application of a first computing device, a plurality of single-use tokens generated by a financial services system, wherein each single-use token of the plurality of single-use tokens comprises token information representing static information associated with a financial account of a user with the financial services system;

causing, via a payment application of a second computing device, an application interface or web page to be displayed, the application interface or web page including a selectable display element for requesting a secure transaction to be performed between the payment application and a merchant system;

receiving, via the payment application, from the application interface or web page, a selection of the display element indicating that a request was made to perform the secure transaction;

receiving, via the digital wallet application, credential information;

determining, via the digital wallet application, a proximity between the first computing device and the second computing device based on a local network to which the first computing device and the second computing device are connected;

authenticating, via the payment application and the digital wallet application, the request based on (i) the proximity and (ii) a determination that the credential information is correct;

transmitting, via the digital wallet application, the request to the financial services system;

receiving, via the digital wallet application, a first single-use token of the plurality of single-use tokens, the first single-use token comprising first token information representing the static information;

transmitting, via the payment application, second token information to the merchant system in place of at least a portion of the static information, wherein the second token information is determined based on the first single-use token;

transmitting, via the merchant system, the second token information to the financial services system;

determining, via the financial services system, that the second token information matches at least some of the first token information included by the first single-use token generated by the financial services system;

receiving, from the financial services system, by the digital wallet application, a confirmation that the secure transaction has been authorized to be executed based on the second token information matching at least some of the first token information; and executing, via the financial services system, the secure transaction.

2. The method of claim 1, wherein the first computing device comprises a user-associated device and the second computing device comprises a payment device.

3. The method of claim 2, wherein the user-associated device is a mobile device, the mobile device comprising a mobile phone, a laptop computer, or a wearable computer, and the payment device comprises a point-of-sale terminal.

4. The method of claim 1, wherein the local network comprises a short-range network.

5. The method of claim 4, wherein the short-range network comprises a Bluetooth link.

6. The method of claim 1, wherein determining the proximity further comprises:

determining the proximity based on a location of at least one of the first computing device or the second computing device.

7. The method of claim 6, wherein the location of the at least one of the first computing device or the second computing device is determined based on a global positioning system (GPS) signal received by a GPS receiver of the at least one of the first computing device or the second computing device.

8. The method of claim 6, wherein the location of at least one of the first computing device or the second computing device is determined based on cellular network information associated with the at least one of the first computing device or the second computing device.

9. The method of claim 1, wherein authenticating the request comprises:
determining that the digital wallet application was running in the first computing device, wherein the second token information is transmitted to the merchant system based on the digital wallet application being determined to be running.

10. The method of claim 9, wherein the digital wallet application running comprises the digital wallet application being an active application.

11. A system for authenticating an electronic financial transaction using a token, comprising:
a merchant system;
a financial services system configured to:
generate a plurality of single-use tokens, each single-use token of the plurality of single-use tokens comprising token information representing static information associated with a financial account of a user with the financial services system; and
one or more computing devices implementing a digital wallet application and a payment application the one or more computing devices being configured to:
display, via the payment application, an application interface or web page including a selectable display element for requesting a secure transaction to be performed between the payment application and a merchant system;
receive, via the digital wallet application, credential information associated with the user;
determine, via the digital wallet application, a proximity of the one or more computing devices based on a local network to which each of the one or more computing devices are connected;
responsive to receiving a selection of the display element indicating that a request was made to perform the secure transaction;
authenticate, via the payment application and the digital wallet application, the request based on (i) the proximity and (ii) a determination that the credential information is correct; and
transmit, via the digital wallet application, the request to the financial services system;
retrieve, via the digital wallet application, a first single-use token of the plurality of single-use tokens, the first single-use token comprising first token information representing the static information;
transmit, via the payment application, second token information to the merchant system in place of at least a portion of the static information, wherein the second token information is determined based on the first single-use token; and
wherein the merchant system is configured to request authorization for the secure transaction by providing the second token information to the financial services system,
wherein the financial services system is configured to:
receive the second token information from the merchant system;
determine that the second token information matches at least some of the first token information included by the first single-use token;
responsive to determining that the first token information matches the second token information, transmit an indication to the merchant system that the secure transaction has been authorized; and
execute the secure transaction with the merchant system based on the indication.

12. The system of claim 11, wherein the one or more computing devices comprise a combined device implementing both the payment application and the digital wallet application.

13. The system of claim 11, wherein the one or more computing devices comprise a first computing device implementing the digital wallet application and a second computing device implementing the payment application.

14. The system of claim 13, wherein the proximity is further determined based on a location of at least one of the first computing device or the second computing device.

15. The system of claim 14, wherein the location of the at least one of the first computing device or the second computing device is determined based on a global positioning system (GPS) signal received by a GPS receiver of the at least one of the first computing device or the second computing device.

16. The system of claim 14, wherein the location of at least one of the first computing device or the second computing device is determined based on cellular network information associated with the at least one of the first computing device or the second computing device.

17. The system of claim 13, wherein the first computing device comprises a user-associated device and the second computing device comprises a payment device.

18. The system of claim 17, wherein the user-associated device is a mobile device, the mobile device comprising a mobile phone, a laptop computer, or a wearable computer, and the payment device comprises a point-of-sale terminal.

19. The system of claim 11, wherein the local network comprises a short-range network.

20. The system of claim 19, wherein the short-range network comprises a Bluetooth link.

21. The system of claim 11, wherein the request is authenticated based on a determination that the digital wallet application was running in the one or more computing devices, wherein the second token information is transmitted to the merchant system based on the digital wallet application being determined to be running.

22. The system of claim 21, wherein the digital wallet application running comprises the digital wallet application being an active application.

* * * * *